United States Patent
Ishida et al.

(10) Patent No.: US 10,903,503 B2
(45) Date of Patent: Jan. 26, 2021

(54) CATALYST FOR SOLID POLYMER FUEL CELL AND METHOD FOR PRODUCING SAME

(71) Applicant: TANAKA KIKINZOKU KOGYO K.K., Tokyo (JP)

(72) Inventors: Minoru Ishida, Kanagawa (JP); Koichi Matsutani, Kanagawa (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 16/580,154

(22) Filed: Sep. 24, 2019

(65) Prior Publication Data

US 2020/0036014 A1 Jan. 30, 2020

Related U.S. Application Data (62) Division of application No. 14/400,424, filed as application No. PCT/JP2013/066798 on Jun. 19, 2013, now Pat. No. 10,454,113.

(30) Foreign Application Priority Data

Jun. 25, 2012 (JP) ................................ 2012-141752

(51) Int. Cl.
*H01M 4/90* (2006.01)
*H01M 4/86* (2006.01)
(Continued)

(52) U.S. Cl.
CPC ....... *H01M 4/9083* (2013.01); *H01M 4/8642* (2013.01); *H01M 4/8652* (2013.01);
(Continued)

(58) Field of Classification Search
CPC ....... H01M 2008/1095; H01M 4/8642; H01M 4/8652; H01M 4/8657; H01M 4/8825;
(Continued)

(56) References Cited

U.S. PATENT DOCUMENTS

| | | | |
|---|---|---|---|
| 2005/0075240 A1* | 4/2005 | Yamamoto | H01M 4/921 502/101 |
| 2005/0106449 A1* | 5/2005 | Fan | B01J 23/8986 429/482 |
| 2007/0254206 A1* | 11/2007 | Gillan | H01M 4/921 429/494 |

FOREIGN PATENT DOCUMENTS

| | | |
|---|---|---|
| EP | 0 552 587 A1 | 7/1993 |
| JP | H04-135642 A | 5/1992 |
| JP | 2011-150867 A | 8/2011 |

OTHER PUBLICATIONS

EP13809878.5 Supplementary Search Report, Nov. 19, 2015, Tanaka Kikinzoku Kogyo K.K.

(Continued)

*Primary Examiner* — Lingwen R Zeng
(74) *Attorney, Agent, or Firm* — Roberts & Roberts, LLP (57) ABSTRACT

The present invention is a catalyst for a solid polymer fuel cell including: catalyst particles of platinum, cobalt and manganese; and a carbon powder carrier supporting the catalyst particles, wherein the component ratio (molar ratio) of the platinum, cobalt and manganese of the catalyst particles is of Pt:Co:Mn=1:0.06 to 0.39:0.04 to 0.33, and wherein in an X-ray diffraction analysis of the catalyst particles, the peak intensity ratio of a Co—Mn alloy appearing around $2\theta=27°$ is 0.15 or less on the basis of a main peak appearing around $2\theta=40°$. It is particularly preferred that the catalyst have a peak ratio of a peak of a $CoPt_3$ alloy and an $MnPt_3$ alloy appearing around $2\theta=32°$ of 0.14 or more on the basis of a main peak.

4 Claims, 3 Drawing Sheets

(51) Int. Cl.
H01M 4/88 (2006.01)
H01M 4/92 (2006.01)
H01M 8/1018 (2016.01)

(52) U.S. Cl.
CPC ....... H01M 4/8657 (2013.01); H01M 4/8825 (2013.01); H01M 4/8882 (2013.01); H01M 4/921 (2013.01); H01M 4/926 (2013.01); H01M 2008/1095 (2013.01)

(58) Field of Classification Search
CPC .. H01M 4/8882; H01M 4/9083; H01M 4/921; H01M 4/926; Y02E 60/50
See application file for complete search history.

(56) References Cited

OTHER PUBLICATIONS

Bonakdarpour et al. : "Oxygen reduction activity of Pt and Pt—Mn—Co electrocatalysts supttered on nano-structured thin film support", Electrochemica Acta, Elsevier Science Publishers, Barking, GB, vol. 53, No. 2, Oct. 11, 2007 (Oct. 11, 2007), pp. 688-694, XP022346622, ISSN: 0013-4686, DOI: 10.1016/J.ELECTACTA. 2007.07.038.

Ghong Bing et al. : "Nanostructured Pt-alloy electrocatalysts for PEM fuel cell oxygen reduction reaction", Chemical Society Reviews, Chemical Society, London, GB, vol. 39, No. 6, Jun. 1, 2010 (Jun. 1, 2010), pp. 2184-2202, XP002663496, ISSN: 0306-0012, DOI: 10.1039/B912332C [retrieved on Mar. 25, 2010].

\* cited by examiner

CATALYST FOR SOLID POLYMER FUEL CELL AND METHOD FOR PRODUCING SAME

CROSS REFERENCE TO RELATED APPLICATIONS

The present application is a divisional of and claims the benefit of co-pending U.S. application Ser. No. 14/400,424 filed on Nov. 11, 2014 as a U.S. national phase entry of International Appln. No. PCT/JP2013/066798 filed on Jun. 19, 2013, and which claims convention priority from Japanese Patent Application No. JP2012-141752 filed on Jun. 25, 2012, all of which are incorporated herein by reference.

TECHNICAL FIELD

The present invention relates to a catalyst for a solid polymer fuel cell. In particular, the present invention relates to a catalyst which is useful for use in a cathode (an air electrode) of a solid polymer fuel cell.

BACKGROUND ART

A fuel cell, in particular a solid polymer fuel cell, is highly expected to become as a next generation power generating system. It is advantageous that the solid polymer fuel cell has a lower operating temperature than that the other fuel cell type has, and is compact. Because of these benefits, the solid polymer fuel cell is promising as a home power supply or an automobile power supply. The solid polymer fuel cell has a layered structure that includes a hydrogen electrode, an air electrode, and a solid polymer electrolyte membrane held between these electrodes. To the hydrogen electrode and the air electrode, a fuel including hydrogen and oxygen or an air are supplied respectively, so that an electric power generated through an oxidation or reduction reaction in each of the electrodes is to be extracted. In addition, to both of the electrodes, a blend of a catalyst with a solid electrolyte to promote the electrochemical reaction is applied in general.

As the catalyst composing the above mentioned electrode, a platinum catalyst which carries a precious metal, in particular platinum, as a catalytic metal is widely used conventionally. This is because platinum as a catalytic metal has so high activity that the electrode reactions in both of the fuel electrode and hydrogen electrode are promoted.

Incidentally, in recent years, in order to reduce the consumed amount of platinum for cost reduction of the catalyst while ensuring the catalytic activity, case examples are increasing that examine an alloy catalyst which uses an alloy of platinum with another metal as a catalytic metal. In particular, a Pt—Co catalyst that has an alloy of platinum with cobalt as a catalyst particle is known as a catalyst capable of reducing the consumed amount of platinum while exhibiting a catalytic activity comparable to or higher than the platinum catalytic activity. In addition, in order to further improve the above mentioned Pt—Co catalyst, a ternary alloy catalyst is advised in which a third alloy element is alloyed (Patent Literature 1).

PRIOR ART DOCUMENT

Patent Literature

Patent Literature 1: JP 2011-150867 A

SUMMARY OF INVENTION

Problems to be Solved by the Invention

However, according to the inventors, no sufficient examination has been made yet of an alloy catalyst available up to now, from a point of view of a practical use for a solid polymer fuel cell. In particular, for a practical use for a solid polymer fuel cell, a high initial activity is required, however, a conventional alloy catalyst has an insufficient four-electron reduction performance of oxygen so that the initial performance is inferior.

In addition, a property required for a practical use for a solid polymer fuel cell includes, an initial activity as well as durability, that is the sustainability of the catalytic activity. A catalyst cannot avoid a decrease in activity (deactivation) that occurs as the time elapses, however, it would be imperative for a practical use of a fuel cell to increase a time before deactivation. In particular, because a cathode catalyst of a solid polymer fuel cell will be used in a severe condition of at a relatively high temperature of around 80° C., in a strong acid atmosphere and a moisture vapor atmosphere, and further under a high potential load, it is a large object for a practical use to improve the durability.

Accordingly, considering that the spread of a fuel cell has been recently realized, it may be said that further improvement of the initial activity and durability is necessary for an alloy catalyst. Thus, the present invention provides an alloy catalyst for a solid polymer fuel cell in which platinum and another metal are alloyed, having an improved initial activity and durability, and a method for producing the same.

Means for Solving the Problems

For achieving the above mentioned object, the inventors experimentally produced a ternary catalyst that was a Pt—Co catalyst to which various metals were added, and performed a screening test for examining the activity of the catalyst. As the result of the examination, it was found that addition of manganese may allow exhibiting an activity comparable to or higher than the conventional Pt—Co catalytic activity. On the other hand, in the examination, the inventors confirmed that enhancement of the activity was not recognized in some cases even when the manganese-added alloy catalyst was used. Thus, studying the cause of this phenomenon, it was found that it is necessary for the component ratio of the individual metals (Co and Mn) added in the ternary catalyst of Pt—Co—Mn to be set to the most suitable range, along with that when a Co—Mn alloy phase exists as a structure of a catalyst particle, a sufficient activity is not exhibited. Furthermore, setting a constant restriction with respect to the Co—Mn alloy phase in the catalyst particles results in an excellent initial activity. Accordingly, the present invention has been conceived.

In other words, the present invention is a catalyst for a solid polymer fuel cell including: catalyst particles of platinum, cobalt and manganese; and a carbon powder carrier carrying the catalyst particles, wherein the component ratio (molar ratio) of the platinum, cobalt and manganese of the catalyst particles is of Pt:Co:Mn=1:0.06 to 0.39:0.04 to 0.33, and in an X-ray diffraction analysis of the catalyst particles, the peak intensity ratio of a Co—Mn alloy appearing around $2\theta=27°$ is 0.15 or less on the basis of a main peak appearing around $2\theta=40°$.

Hereinafter, a more detailed description is made of the present invention. The catalyst according to the present invention, which has catalyst particles composed of platinum, cobalt and manganese as described above, is characterized by two features that the component ratio of cobalt and manganese that are additive elements with respect to platinum is restricted within a certain range, and the content of the Co—Mn alloy phase in the catalyst particles is suppressed. Hereinafter, a description is made of these features at first.

The reason why the component ratio of platinum, cobalt and manganese is set to Pt:Co:Mn=1:0.06 to 0.39:0.04 to 0.33 is that an initial activity comparable to or higher than the Pt—Co catalytic activity is exhibited. The reason why manganese is added as a third metal element into a Pt—Co catalyst is that the four-electron reduction function of an oxygen molecule is improved, thereby the catalytic activity being enhanced. Accordingly, a certain degree of addition of manganese is required, however, excessive addition reduces the activity on the contrary. When the component ratio of cobalt and manganese deviates from the above mentioned range, the activity becomes equal to or lower than the conventional Pt—Co catalytic activity, so that setting of the component ratio is necessary. Note that a more preferable range of the component ratio of cobalt and manganese is within Pt:Co:Mn=1:0.06 to 0.26:0.13 to 0.33, within which range the maximum initial activity is exhibited.

In addition, manganese is not only required to be added, but also required to be in a predetermined form of existence in relationship with the other composing elements (platinum and cobalt) that compose the catalyst particles. In other words, basically the metallic phase that composes the catalyst particle of the ternary catalyst of Pt—Co—Mn is predominately an alloy phase in which the individual metals are mutually alloyed, although a Pt phase may possibly be partially remained. As examples of this alloy phase, an Mn—Pt alloy phase ($MnPt_3$), Co—Pt alloy phase ($CoPt_3$), and Mn—Co alloy phase (MnCo) can be given. It is considered that the type and abundance of these alloy phases vary in accordance with a process for producing the catalyst.

The inventors examined an effect of each of the alloy phases on the catalytic activity, so it was found that when the Mn—Co alloy phase exists in the catalyst particles, the initial activity greatly decreases, and thus the effect of manganese addition disappears. Although the cause of this phenomenon is unknown, it is considered this is because the activated species of the ternary catalyst of Pt—Co—Mn is likely the Mn—Pt alloy phase or Co—Pt alloy phase, and thus when added Mn and Co are not alloyed with Pt but become the Mn—Co alloy phase, the activated species is difficult to be formed. In the present invention, in order to restrict the abundance of the Mn—Co alloy phase, the peak intensity of a Co—Mn alloy in an X-ray diffraction analysis of the catalyst particles is controlled.

The reason why the result of the X-ray diffraction analysis is used for specification of the abundance of the Mn—Co alloy phase is that the X-ray diffraction analysis is a relatively simple analytic method, however it can measure the state of catalyst particles accurately and also has a quantifying capability through an appropriate base peak setting. Herein, in the X-ray diffraction analysis of the ternary catalyst of Pt—Co—Mn according to the present invention, as the base peak, a main peak appearing at $2\theta=40°$ to $41°$ (a synthetic peak of Pt, $MnPt_3$ and $CoPt_3$) is used. The peak of the Mn—Co alloy phase that is to be controlled according to the present invention appears around $2\theta=27°$, $33°$, $43°$, $52°$ or $76°$, however, as the peak of the Mn—Co alloy phase used in the present invention, a peak around $2\theta=27°$ is preferably used.

The reason why the peak ratio representing the abundance of the Mn—Co alloy phase is set to 0.15 or less is that the upper limit to obtain a preferred catalyst is made definite, otherwise the Mn—Co alloy phase has the unpreferable effect on the catalytic activity as mentioned above. Accordingly, this peak ratio may also be 0, which is rather preferable.

In addition, as to the distribution of the alloy phases composing the catalyst particles, because the Mn—Co alloy phase is reduced as mentioned above, a distribution in which the Mn—Pt alloy phase ($MnPt_3$) and Co—Pt alloy phase ($CoPt_3$) are formed is preferable. These alloy phases have the four-electron reduction effect of an oxygen molecule and thus contribute to enhancement of the activity. In the X-ray diffraction analysis, both of these alloy phases appear around $2\theta=24°$, $32°$ or $41°$, but it is preferable to make a judgment based on a peak appearing around $2\theta=32°$. The peak derived from these two alloy phases is of the synthesis of a peak of the Mn—Pt alloy phase and a peak of the Co—Pt alloy phase, and thus is difficult to be separated. Accordingly, in order to verify the formation of these alloy phases, it is preferable to judge the synthetic peak intensity thereof. The preferable peak intensity is preferably such that the intensity of a peak appearing around $2\theta=32°$ is of 0.14 or more on the basis of a main peak appearing at $2\theta=40°$ to $41°$. In addition, the preferable upper limit of this peak intensity ratio is around 0.23.

Setting the component ratio of cobalt and manganese, and controlling the Mn—Co alloy phase as described above allow for producing a ternary catalyst of Pt—Co—Mn having an excellent initial activity. Herein, as already described, it is also preferable for the catalyst for a fuel cell to have an excellent durability.

According to the inventors, the cause of deterioration of the ternary catalyst of Pt—Co—Mn includes disappearance of the metals (cobalt and manganese) from the catalyst particles due to the electrochemical dissolution. Because the catalyst for a fuel cell is of an electrode member and thus exposed to an electrochemical reaction, cobalt and manganese that are base metals are ionized and dissolved with time to disappear from the catalyst. During a step of such an electrochemical dissolution, cobalt and manganese inside the catalyst particles diffuse toward the particle surface and dissolves, leading to fluctuation of the component ratio of cobalt and manganese in the catalyst particles.

In the present invention, the cobalt concentration and manganese concentration at the surface of the catalyst particles are made lower than the cobalt concentration and manganese concentration at the center thereof, with the result that the durability may be improved. Thus, bringing into a state where the platinum concentration at the surface of the catalyst particles is high, that is a state of a core/shell structure allows the surface of the catalyst particles to resist the electrochemical dissolution, with the result that decreasing of the activity may be suppressed. This reduction of the cobalt concentration and manganese concentration at the surface of the catalyst particles (corresponding to enrichment of the platinum concentration at the surface of the catalyst particles) does not necessarily require that the surface be of pure platinum, but has only to result in a concentration difference of the cobalt concentration and manganese concentration between the surface of the catalyst particles and the center thereof.

The catalyst particles preferably have a mean particle diameter of from 2 to 20 nm. This is because when the mean particle diameter is less than 2 nm, a long-time sustainability of the activity is not expressly provided, whereas the mean particle diameter is more than 20 nm, the initial activity of the catalyst is not sufficiently provided. In addition, as a carbon powder that is a carrier, it is preferable to use a carbon powder having a specific surface area of from 250 to 1200 $m^2/g$. This is because setting the specific surface area to 250 $m^2/g$ or more allows for increasing an area to which the catalyst attaches, and thus dispersing the catalyst particles in a high state, thereby increasing the effective surface area, whereas in case where the specific surface area is more than 1200 $m^2/g$, the abundance of ultrafine pores (less than approximately 20 Å) into which an ion exchange resin is hard to intrude when the electrode is formed becomes so high that the utilization efficiency of the catalyst particles decreases.

In addition, in light of the performance of the catalyst according to the present invention as the electrode of a solid polymer fuel cell, the carried density of the catalyst particles is preferably from 30 to 70%. Herein, the carried density means a ratio of the mass of the catalyst particles that are carried by the carrier (the total mass of platinum, cobalt and manganese carried) to the mass of the whole catalyst.

Next, a description is made of a method for producing the catalyst for a solid polymer fuel cell according to the present invention. In the production of the catalyst according to the present invention, the basic step follows a general method for producing an alloy catalyst, which includes allowing a carrier to carry metals that are to become catalyst particles, and carrying out drying appropriately and then a heat treatment, thereby alloying the carried metals. However, the catalyst according to the present invention is required to suppress formation of the Mn—Co alloy phase in the catalyst particles.

As to this control of the alloy phase in the catalyst particles, in the catalytic metal-carrying step, it is necessary for the present invention to prepare at first a catalyst which carries only platinum and allow this catalyst to carry cobalt and manganese. In the catalytic metal-carrying step, it is general and effective to allow the carrier to carry composing metals simultaneously (see Example in Patent Literature 1), however, such a simultaneous carrying step results in formation of the Mn—Co alloy phase exceeding the specified value according to the present invention. Preparing (producing) a platinum catalyst at first and separately allowing this catalyst to carry cobalt and manganese suppress the formation of the Mn—Co alloy phase. Although the cause is unknown, it is considered this is because doing in this way facilitates alloying of platinum with cobalt, and alloying of platinum with manganese, and thus prioritizes formation of the Mn—Pt alloy phase ($MnPt_3$) and Co—Pt alloy phase ($CoPt_3$).

As to the preparation of the platinum catalyst, the platinum catalyst may be prepared according to a conventional method for producing a platinum catalyst. A commercial platinum catalyst may also be used. In general, a platinum catalyst is produced through a contact of a platinum salt solution with a carrier (via impregnation or dripping), followed by a reduction treatment, resulting in formation of platinum particles.

Carrying of cobalt and manganese by the platinum catalyst per se also follows a common method. Bringing the platinum catalyst into contact with metal salt solutions of cobalt and manganese, followed by a reduction treatment allows the cobalt and manganese to precipitate in a metallic state around the platinum particle. As the metal salt solution of cobalt, cobalt chloride hexahydrate, cobalt nitrate, cobalt acetate tetrahydrate and the like may be used, and as the metal salt solution of manganese, manganese chloride tetrahydrate, manganese nitrate hexahydrate, manganese acetate tetrahydrate and the like may be used. At this time, the order of contact of the platinum catalyst with the metal salt solutions is not particularly limited, but the platinum catalyst may be brought into contact with either of the metal salt solutions first, or the platinum catalyst may be bring into contact with a mixture of the metal salt solutions of cobalt and manganese.

In addition, as to the supported amount of cobalt and manganese, the concentrations and amounts of the metal salt solutions may be set in view of the supported amount of the platinum catalyst, so as to result in the ratio which is set within the component ratio of cobalt and manganese as described above. However, in case of performing an acid treatment as described below due to the enrichment of the platinum concentration at the surface of the catalyst particles, the carried amount of cobalt and manganese may be increased around from 1.5 to 5 times for cobalt, and around from 1.5 to 3 times for manganese, with respect to the set component ratio.

After the platinum catalyst supports cobalt and manganese, drying if necessary and then a heat treatment are performed to alloy the individual metals. Herein, the heat treatment temperature for alloying is set from 700 to 1100° C. When the heat treatment is performed below 700° C., the alloying, in particular the formation of the Mn—Pt alloy phase and Co—Pt alloy phase is insufficient, thereby resulting in the catalyst having a poor activity. In addition, as the heat treatment temperature is higher, the alloying is more likely to proceed, and the formation of the Mn—Pt alloy phase and Co—Pt alloy phase is more likely to be promoted, however, in order to perform the heat treatment beyond 1100° C., there is concerned about coarsening of the catalyst particles and arises a difficulty associated with equipment, so that the upper limit is set to 1100° C. It is preferable to perform this heat treatment in a non-oxidizing atmosphere, in particular preferable to perform the heat treatment in a reducing atmosphere (such as an atmosphere of hydrogen gas).

The catalyst that has undergone the above mentioned heat treatment step is a ternary catalyst of Pt—Co—Mn including the catalyst particles with the Mn—Co alloy phase reduced and the formation of the Mn—Pt alloy phase and Co—Pt alloy phase enhanced, and having an excellent initial activity. This catalyst can ensure the durability when the cobalt and manganese concentration at the surface of the catalyst particles is made lower than the cobalt and manganese concentration at the center thereof.

The step of decreasing the cobalt and manganese concentration at the surface of the catalyst particles includes bringing the catalyst that has undergone the heat treatment into contact with an oxidizing solution at least one time. Doing in this way allows eluting cobalt and manganese at the surface of the catalyst particles and thus decreasing the cobalt and manganese concentration only at the surface. The preferable oxidizing solution includes a solution of sulfuric acid, nitric acid, phosphorous acid, potassium permanganate, hydrogen peroxide, hydrochloric acid, chloric acid, hypochlorous acid, chromic acid or the like. The concentration of the oxidizing solution is preferably from 0.1 to 1 mol/L. In addition, it is preferable to immerse the catalyst in the solution.

As to a condition of the oxidizing solution treatment, the contact time is preferably from 1 to 10 hours, and the treatment temperature is preferably from 40 to 90° C. In addition, in the oxidizing solution treatment, the catalyst may be brought into contact with the oxidizing solution one time, or several times repeatedly. Furthermore, in case where the acid treatment is performed several times, the type of solution may be modified for every treatment.

Advantageous Effects of Invention

As described above, the catalyst for a polymer solid electrolyte fuel cell according to the present invention adopts the ternary catalyst form in which Mn is added to a Pt—Co catalyst, has the limitation of the component ratio of cobalt and manganese, and further has the specification of the alloy phase in the catalyst particles, with the result that the initial activity is excellent. In addition, the cobalt and manganese concentration at the surface of the catalyst particles is made lower than the cobalt and manganese concentration at the center thereof, with the result that the electrochemical dissolution of the catalytic metals may be suppressed and the durability thereof may be ensured.

DESCRIPTION OF EMBODIMENTS

First Embodiment

A plurality of ternary catalysts of Pt—Co—Mn with a different component ratio of catalytic metals were produced, and the property was investigated and the catalytic activity was evaluated. A basic step for producing the catalyst is as follows.

[Supporting of Catalytic Metals]

A commercially-available platinum catalyst was prepared, by which cobalt and manganese were supported. As to the platinum catalyst used, 5 g of the platinum catalyst using a carbon fine powder (a specific surface area of approximately 900 $m^2/g$) as a carrier with a platinum supporting ratio of 46.5% by mass (2.325 g (11.92 mmol) in terms of platinum) were prepared. This platinum catalyst was immersed and stirred in a metal salt solution, which had been prepared through dissolution of cobalt chloride ($CoCl_2.6H_2O$) and manganese chloride ($MnCl_2.4H_2O$) in 100 mL of ion exchanged water, on a magnetic stirrer. To this solution, 500 mL of a sodium borohydride (SBH) solution with a concentration of 1% by mass were added dropwise, followed by stirring and a reduction treatment, so that cobalt and manganese were supported by the platinum catalyst. Subsequently, filtering, washing and drying were performed.

[Supporting of Catalytic Metals]

The catalyst which supported the catalytic metals was subjected to a heat treatment for alloying. In the embodiment, a heat treatment for 30 minutes in 100% hydrogen gas at a heat treating temperature of 900° C. was performed. The heat treatment for alloying produced the ternary catalyst of Pt—Co—Mn.

In addition, in the embodiment, as to the metal salt solution of cobalt and manganese in which the platinum catalyst was to be immersed, the added amount of each metal salt was adjusted, thereby the component ratio of the catalytic metals being changed. In the embodiment, as to the component ratio of the individual metals (Pt:Co:Mn), 6 kinds of catalysts were produced, including 1:0.39:0.04 (Example 1), 1:0.26:0.13 (Example 2), 1:0.13:0.25 (Example 3), 1:0.06:0.33 (Example 4), 1:0.38:0 (Mn not added, Comparative Example 1), and 1:0.02:0.39 (Comparative Example 2).

CONVENTIONAL EXAMPLE

Herein, in the catalytic metal-carrying step, platinum, cobalt and manganese were simultaneously carried to produce the ternary catalyst of Pt—Co—Mn. Five grams of a carbon carrier (a specific surface area of approximately 900 $m^2/g$) were prepared. This carrier was immersed and stirred in a predetermined amount of a Pt dinitrodiamine ($Pt(NO_2)_2(NH_3)_2$) solution of nitric acid and a metal salt solution, which had been prepared through dissolution of cobalt chloride ($CoCl_2.6H_2O$) and manganese chloride ($MnCl_2.4H_2O$) in 100 mL of ion exchanged water, on a magnetic stirrer. To this solution, 500 mL of a sodium borohydride (SBH) solution with a concentration of 1% by mass were added dropwise, followed by stirring and a reduction treatment, so that platinum, cobalt and manganese were supported on the carbon carrier. Subsequently, filtering, washing and drying were performed, and a heat treatment for 30 minutes in hydrogen air flow at 900° C. was carried out for alloying.

Each of the ternary catalysts of Pt—Co—Mn in Examples, Comparative Examples and the conventional example, produced as described above, was analyzed by an X-ray diffraction analysis, and the composition of catalyst particles was examined. As an X-ray diffractometer, JDX-8030 made by JEOL was used. A sample was placed in a glass cell in a fine powder form. Cu (a kα line) as an X-ray source, a tube voltage of 40 kV, a tube current of 30 mA, $2\theta=20$ to $90°$, a scan speed of 7°/min, a step angle of 0.1°.

Figure 1:
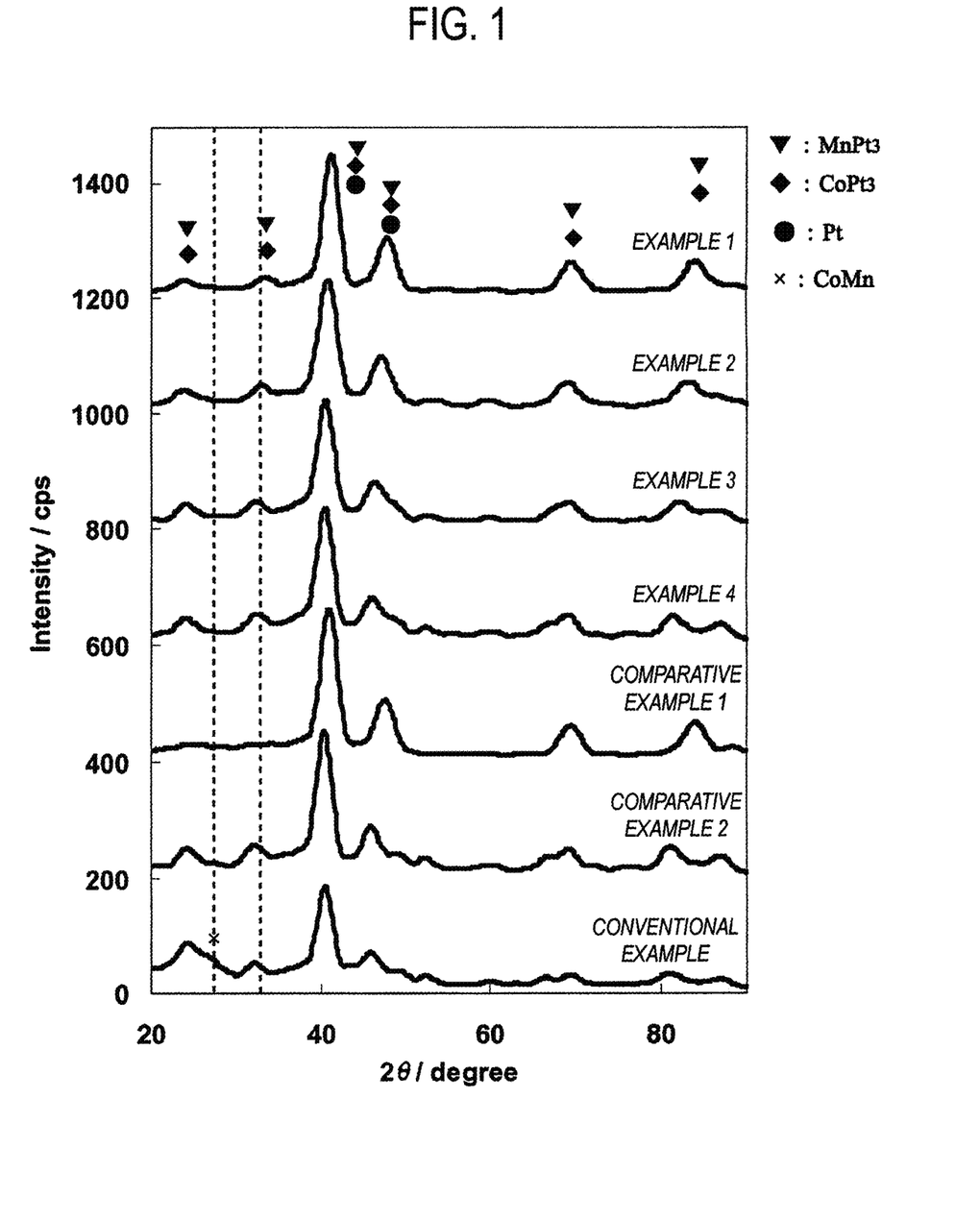
FIG. 1 illustrates X-ray diffraction patterns of respective catalysts according to Examples 1 to 4, Comparative Examples 1 and 2, and a conventional example.

FIG. 1 shows X-ray diffraction patterns of the respective catalysts. In FIG. 1, a peak appearing around $2\theta=40°$, which is found for all of the catalysts, is a synthetic peak of metals Pt, $MnPt_3$ and $CoPt_3$. A peak around $2\theta=32°$ (32 to 34°) in Examples 1 to 4 and Comparative Example 2 is a synthetic peak of $MnPt_3$ and $CoPt_3$, which is not influenced by a metal Pt. On the other hand, in the conventional example, a peak that is rarely found in each of the Examples and Comparative Examples is found around $2\theta=27°$. This is considered to be derived from a Co—Mn alloy.

Next, a test for the initial performance of each of the ternary catalysts of Pt—Co—Mn in Examples, Comparative Examples and the conventional example was performed. This test for the performance was carried out by measuring the Mass Activity. For an experiment, a single cell was used, and a proton conducting polymer electrolyte membrane was held between a cathode electrode and an anode electrode each having an electrode area of 5 cm×5 cm=25 $cm^2$, so that a Membrane Electrode Assembly (MEA) was produced and evaluated. As a pretreatment, a current/voltage curve was drawn in a condition of a hydrogen flow rate=1000 mL/min, oxygen flow rate=1000 mL/min, cell temperature=80° C., anode humidifying temperature=90° C., and cathode humidifying temperature=30° C. Subsequently, as main measurement, the Mass Activity was measured. As to a test method, a current value (A) at 0.9 V was measured, and a current value per 1 g of Pt (A/g-Pt) was obtained based on the Pt weight applied on the electrode, so that the Mass Activity was calculated. The result is indicated in Table 1. In addition, in Table 1, a peak intensity ratio of the Co—Mn alloy (around 2θ=27°) and peak intensity ratio of the MnPt$_3$ and CoPt$_3$ (around 2θ=32°), calculated from the X-ray diffraction pattern of each of the catalysts in FIG. 1, are also indicated.

TABLE 1

|  | Pt:Co:Mn | Mass Activity*[1] (A/g-Pt at 0.9 V) | Peak Intensity Ratio*[2] | |
|---|---|---|---|---|
|  |  |  | Co—Mn | MnPt$_3$ + CoPt$_3$ |
| Example 1 | 1:0.39:0.04 | 1.09 | 0.08 | 0.14 |
| Example 2 | 1:0.26:0.13 | 1.21 | 0.11 | 0.21 |
| Example 3 | 1:0.13:0.25 | 1.12 | 0.11 | 0.14 |
| Example 4 | 1:0.06:0.33 | 1.22 | 0.11 | 0.22 |
| Comparative Example 1 | 1:0.38:0 | 1.0 | — | 0.11 |
| Comparative Example 2 | 1:0.02:0.39 | 0.93 | 0.11 | 0.22 |
| Conventional Example | 1:0.25:0.36 | 0.93 | 0.33 | 0.28 |

*[1]It is a relative comparison with respect to 1.0 for Comparative Example 1 (a Pt—Co catalyst)
*[2]It is an intensity ratio, on the basis of a main peak around 2θ = 40°

From Table 1, all of the ternary catalysts of Pt—Co—Mn in the individual Examples exhibit a good initial activity on the basis of the Pt—Co catalyst. However, only adding manganese is not always sufficient, because the component ratio with the added amount excessive like Comparative Example 2 has a lower initial activity than the Pt—Co catalytic activity. In addition, as to the composition of the catalyst particles, the conventional example in which a lot of Co—Mn phase is generated has a poor initial activity even when the component ratio of Pt, Co and Mn is made appropriate. Accordingly, it has been confirmed that it is insufficient only to make appropriate the component ratio of the individual catalytic metals, and thus it is also necessary to specify the composition of the alloy phase.

Second Embodiment

Herein, as to the ternary catalyst of Pt—Co—Mn, a confirmation was done of the durability-enhancement effect by improvement of the surface composition of the catalyst particles through an acid solution treatment. As to the catalyst of Example 2 in the first embodiment (Pt:Co:Mn=1:0.26:0.13), the catalyst that had undergone the heat treatment was treated in 0.2 mol/L sulfuric acid aqueous solution at 80° C. for 2 hours, and subsequently, filtering, washing and drying were performed. The treated catalyst was then treated in 1.0 mol/L nitric acid aqueous solution (a dissolved oxygen content of 0.01 cm$^3$/cm$^3$ (in terms of STP)) at 70° C. for 2 hours, and subsequently, filtering, washing and drying were performed (the catalyst that had undergone this acid solution treatment was defined as Example 5).

Figure 2A:
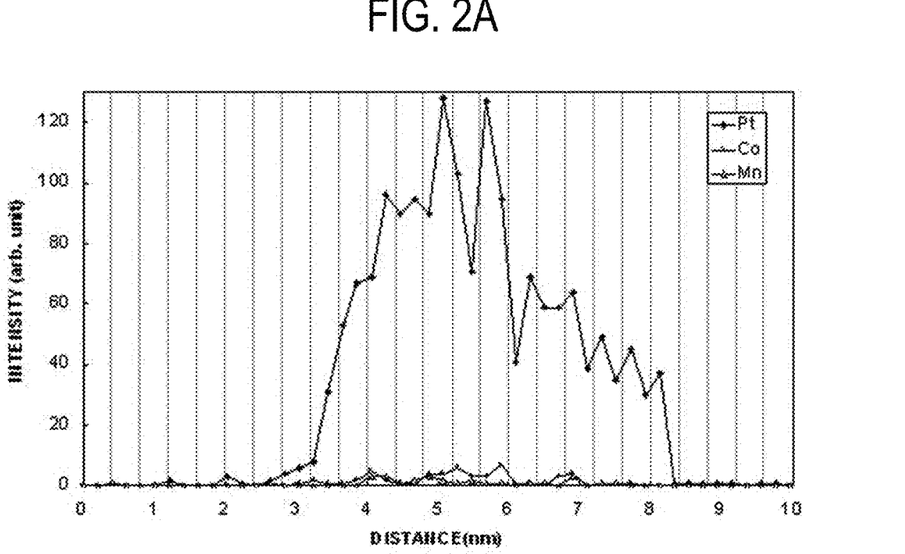
FIG. 2A illustrates TEM/EDX concentration distributions of Pt, Co and Mn of catalyst particles according to Example 5.
Figure 2B:
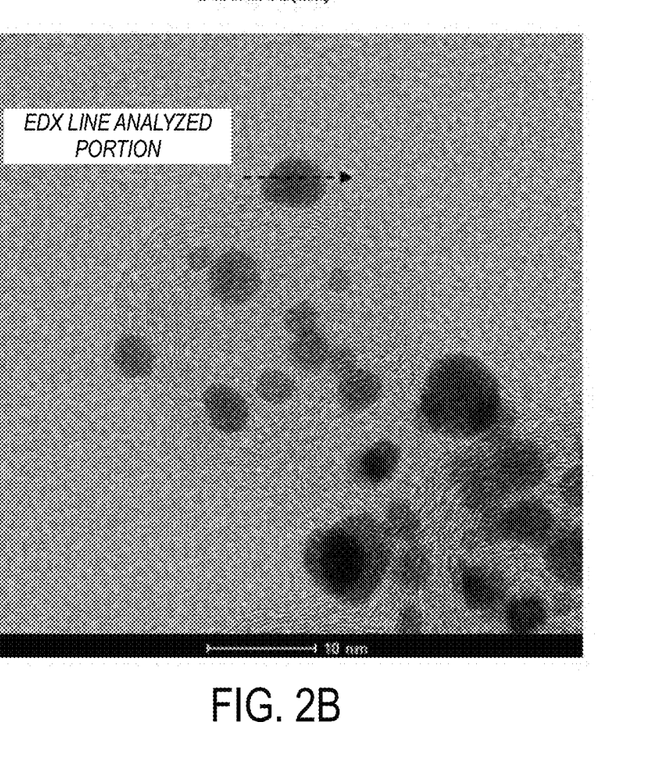
FIG. 2B is an SEM photograph showing catalyst particles according to Example 5 analyzed with TEM/EDX.

As to the catalyst that had undergone the treatment, an elementary analysis of the catalyst particles was performed. In the elementary analysis, the cross section of the catalyst particles was line analyzed by TEM/EDX for measurement of the content of Pt, Co and Mn at equal intervals of 0.2 nm, so that the compositions were compared between the particle surface and the particle center. The results of analysis are shown in FIG. 2A and FIG. 2B. As for the catalyst particles that had undergone the acid solution treatment, around the surface (the region at a depth of from 1 to 1.5 nm from the most external surface), the detection intensity of cobalt and manganese is extremely lower. From the analysis, it has been confirmed that this catalyst has an outer layer of the catalyst particles enriched with Pt, and the particle center formed of an alloy including Co and Mn.

Next, a durability test was performed for this catalyst, and the durability was evaluated. In the durability test, a cathode electrode (an air electrode) was produced from the catalyst to compose a fuel cell, for which an accelerated degradation test was performed in which a cell electrical potential of the cathode was swept with a triangular wave, so that the power generation property after degradation was measured. As to the accelerated degradation, sweeping at a sweep rate of 40 mV/s between 200 and 650 mV for 20 hours was performed, the surface of the catalyst particles was cleaned, and subsequently, sweeping at a sweep rate of 100 mV/s between 200 and 650 mV for 24 hours was performed to result in degradation, so that the Mass Activity of the catalyst after the degradation was measured. Evaluation after the accelerated degradation test was also performed for Comparative Example 1 (a Pt—Co catalyst) (Comparative Example 3). The result is indicated in Table 2.

TABLE 2

|  | Pt:Co:Mn | Mass Activity*[1] (A/g-Pt at 0.9 V) | Peak Intensity Ratio*[2] | |
|---|---|---|---|---|
|  |  |  | Co—Mn | MnPt$_3$ + CoPt$_3$ |
| Example 5 | 1:0.26:0.13 | 1.10 | 0.11 | 0.21 |
| Comparative Example 3 | 1:0.38:0 | 0.87 | — | 0.11 |

*[1]It is a value, in case of "1.0" for a Pt—Co catalyst without degradation (Comparative Example 1)
*[2]It is an intensity ratio, on the basis of a main peak around 2θ = 40°

It is noted from Table 2 that the catalytic activity of the conventional Pt—Co catalyst decreases in the accelerated degradation test, whereas the ternary catalyst of Pt—Co—Mn according to Example 5 exhibits a good activity after the degradation. It has been confirmed that such a catalyst having a difference of platinum concentration between the surface of the catalyst particles and the center thereof has an excellent durability.

Third Embodiment

Figure 3:
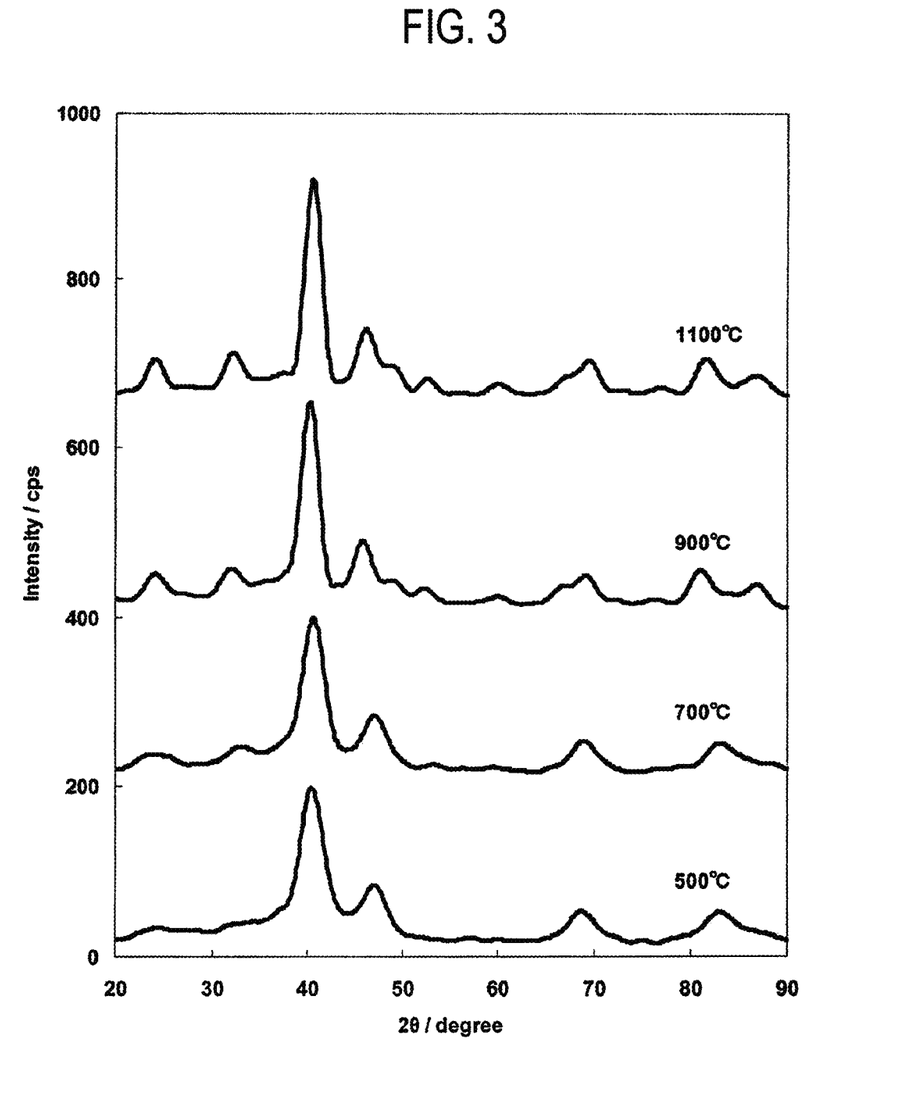
FIG. 3 illustrates X-ray diffraction patterns of respective catalysts for heat treatment temperatures.

Herein, in the process for producing the ternary catalyst of Pt—Co—Mn, the temperature of the heat treatment for alloying was examined. As to Example 3 (Pt:Co:Mn=1:0.13:0.25), catalysts were produced at heat treatment temperatures of 500° C., 700° C., 900° C. (Example 3) and 1100° C., and the initial activity was evaluated. The result is indicated in Table 3. In addition, in FIG. 3, the X-ray diffraction patterns of the respective catalysts are shown.

TABLE 3

|  | Heat Treatment Temperature | Mass Activity*[1] (A/g-Pt at 0.9 V) | Peak Intensity Ratio*[2] | |
|---|---|---|---|---|
|  |  |  | Co—Mn | MnPt$_3$ + CoPt$_3$ |
| Comparative Example 4 | 500° C. | 0.80 | 0.16 | 0.19 |
| Example 6 | 700° C. | 1.07 | 0.13 | 0.23 |
| Example 3 | 900° C. | 1.12 | 0.11 | 0.22 |
| Example 7 | 1100° C. | 1.20 | 0.09 | 0.23 |

*[1]It is a value, in case of "1.0" for a Pt—Co catalyst without degradation (Comparative Example 1)
*[2]It is an intensity ratio, on the basis of a main peak around 2θ = 40°

From Table 3, it has been confirmed that in order to obtain an effective initial activity, a heat treatment at 700° C. or higher is necessary. In this regard, from the X-ray diffraction patterns in FIG. 3, as the heat treatment temperature is higher, the peak intensity of $MnPt_3$ and $CoPt_3$ around $2\theta=32°$ is sharper and clearer. It may also be confirmed here that it is preferable for the formation of the alloy phases of $MnPt_3$ and $CoPt_3$ useful for the catalytic activity to make higher the heat treatment temperature.

INDUSTRIAL APPLICABILITY

According to the present invention, the electrode catalyst for a solid polymer fuel cell can achieve both durability improvement and the initial power generation property improvement. The present invention contributes to popularization of a fuel cell, and eventually becomes a basis for solution to an environmental problem.

The invention claimed is:

1. A catalyst for a solid polymer fuel cell comprising:
catalyst particles of platinum, cobalt and manganese; and
a carbon powder carrier supporting the catalyst particles, wherein
the catalyst particles were formed by subjecting a metallic salt solution of said metals to a reduction treatment,
a molar ratio of the platinum, cobalt and manganese of the catalyst particles is of Pt:Co:Mn=1:0.06 to 0.13:0.25 to 0.33, and
in an X-ray diffraction analysis of the catalyst particles, a peak intensity ratio of a Co—Mn alloy appearing around $2\theta=27°$ is 0.15 or less on the basis of a main peak appearing around $2\theta=40°$,
wherein in an X-ray diffraction analysis of the catalyst particles, a peak ratio of a peak of a $CoPt_3$ alloy and an $MnPt_3$ alloy appearing around $2\theta=32°$ is 0.14 or more on the basis of a main peak appearing around $2\theta=40°$.

2. The catalyst for a solid polymer fuel cell according to claim 1, wherein a cobalt concentration and a manganese concentration at a surface of the catalyst particles are lower than a cobalt concentration and the manganese concentration at a center of the particles.

3. The catalyst for a solid polymer fuel cell according to claim 1, wherein a supported density of the catalyst particles is from 30 to 70%.

4. The catalyst for a solid polymer fuel cell according to claim 2, wherein a supported density of the catalyst particles is from 30 to 70%.

* * * * *